United States Patent
Clarke

[11] Patent Number: 6,161,520
[45] Date of Patent: Dec. 19, 2000

[54] MULTIPLE SPARK IGNITION GASKET

[75] Inventor: William A. Clarke, Irvine, Calif.

[73] Assignee: The Gasket King, Irvine, Calif.

[21] Appl. No.: 09/273,859

[22] Filed: Mar. 22, 1999

[51] Int. Cl.[7] .............................. F02P 15/08; F16J 15/02
[52] U.S. Cl. .................................. 123/310; 123/169 MG; 174/120 R; 277/591; 277/600
[58] Field of Search ...................... 123/169 EL, 169 MG, 123/169 R, 310; 174/110 SR, 120 R, 120 C, 120 SR; 277/313, 591, 600; 428/383, 447; 528/10

[56] References Cited

U.S. PATENT DOCUMENTS

| | | | |
|---|---|---|---|
| 2,775,234 | 12/1956 | Smits | 123/169 R |
| 2,904,610 | 9/1959 | Morrison | 123/169 R |
| 2,948,824 | 8/1960 | Smits | 123/169 R X |
| 3,906,139 | 9/1975 | Hiraoka et al. | 428/383 |
| 4,628,003 | 12/1986 | Katz | 174/110 SR X |
| 5,046,466 | 9/1991 | Lipski | 123/310 |
| 5,380,014 | 1/1995 | Schaperkotter | 277/317 |
| 5,725,953 | 3/1998 | Onishi et al. | 428/383 |
| 5,750,257 | 5/1998 | Doshita et al. | 428/383 X |

*Primary Examiner*—Tony M. Argenbright
*Attorney, Agent, or Firm*—Robert R. Meads; Anthony T. Cascio

[57] ABSTRACT

A gasket of non-conductive material formed of layers of a ceramic between which is embedded a wire circuit for connecting spark electrodes, high voltage connectors and ground connectors of a spark ignition system. The wire circuit includes small diameter wires surrounding gasket openings for bounding and sealing the edges of combustion chambers defined by cylinders in an internal combustion engine. The small diameter wires are insulated by the high dielectric layers of the gasket as well as by high dielectric wrappings and a sheath of high dielectric material bonded to and within the layers forming to gasket.

7 Claims, 3 Drawing Sheets

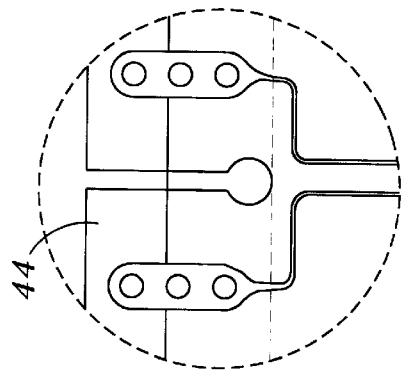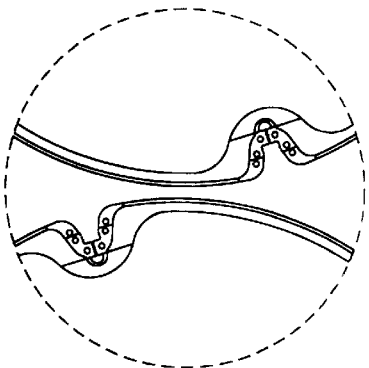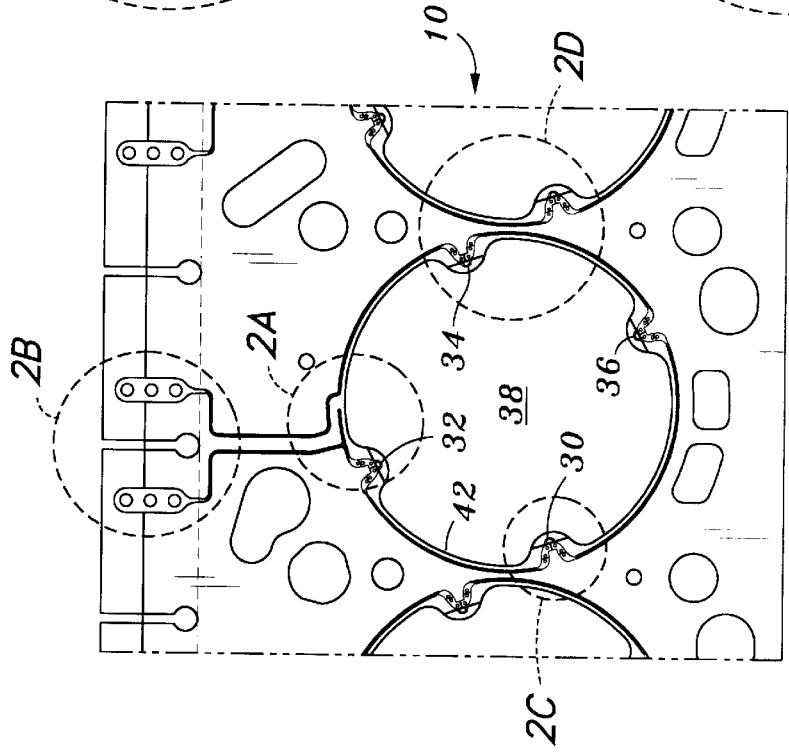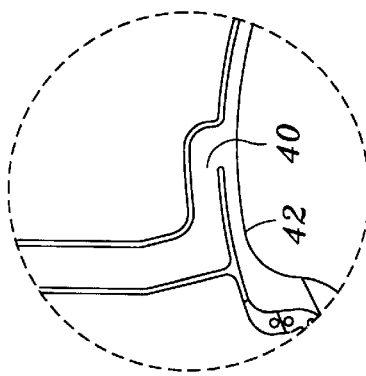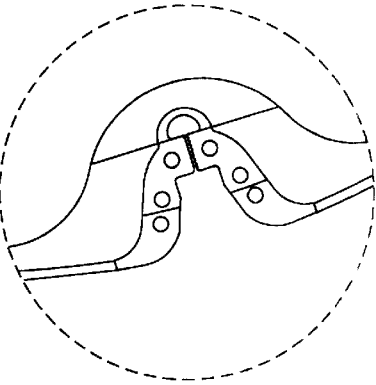

MULTIPLE SPARK IGNITION GASKET

FIELD OF INVENTION

The present invention relates to gaskets for internal combustion engines, and, more particularly, to an improved multiple spark ignition gasket for internal combustion engines.

BACKGROUND OF INVENTION

On Sep. 10, 1991, U.S. Pat. No. 5,046,466 issued for "Spark-Ignition Engine". The patent describes an internal combustion engine which does not require the use of conventional spark plugs. As described, the patented engine has a circuit module clamped in a gasket format between a cylinder assembly and a head assembly of the engine. The circuit module includes a substrate of electrically insulative material supporting a foil circuit for connecting electrode members to a pulser. The pulser generates intermittent high voltage signals which produce spark ignition of fuel in combustion chambers defined by cylinders in the cylinder assembly.

Over the past several years major development programs have expended millions of dollars in attempts to develop commercially feasible versions of the invention described in the above-described '466 patent, without success. Thus, while a multiple spark ignition gasket-like module for internal combustion engines which will eliminate the need for conventional spark plugs may be an interesting concept, to date it remains just that, an interesting concept.

Recently however, non-conductive internal combustion engine gasket materials have been developed by William A. Clarke, the inventor of the subject matter described in the present patent application. Such non-conductive gasket materials are described in Mr. Clarke's copending U.S. patent applications Ser. Nos. 08/962,782; 08/962,783 and 09/185,282 which are incorporated herein by this reference to form part of the detailed description of gasket materials and gaskets useful in the multiple spark ignition gasket of the present invention. Recently Mr. Clarke has discovered a circuit configuration and wiring methodology which in combination with his previously developed non-conductive gasket materials and gaskets, overcomes the problems which have heretofore precluded the development of a commercially feasible gasket-like multiple spark ignition system for internal combustion engines which eliminates the need for conventional spark plugs. The subject patent application describes and claims Mr. Clarke's discovery.

SUMMARY OF INVENTION

Basically, the present invention comprises a gasket of non-conductive material formed of layers of a fabric reinforced rubber composite laminate between which is embedded a wire circuit for connecting spark electrodes, high voltage connectors and ground connectors of a spark ignition system. The wire circuit includes small diameter wires surrounding gasket openings for bounding and sealing the edges of combustion chambers defined by cylinders in an internal combustion engine. The small diameter wires are insulated by the high dielectric layers of the gasket as well as by high dielectric wrappings and a sheath of high dielectric material bonded to and within the layers forming to gasket.

BRIEF DESCRIPTION OF THE DRAWINGS

FIG. 2 is a top view of a portion of the gasket of FIG. 1 with portions of the gasket bounded by circles 2A, 2B, 2C and 2D designating portions illustrated in the enlarged view of FIGS. 2A, 2B, 2C and 2D respectively.

DETAILED DESCRIPTION OF PREFERRED EMBODIMENTS

Figure 1A:
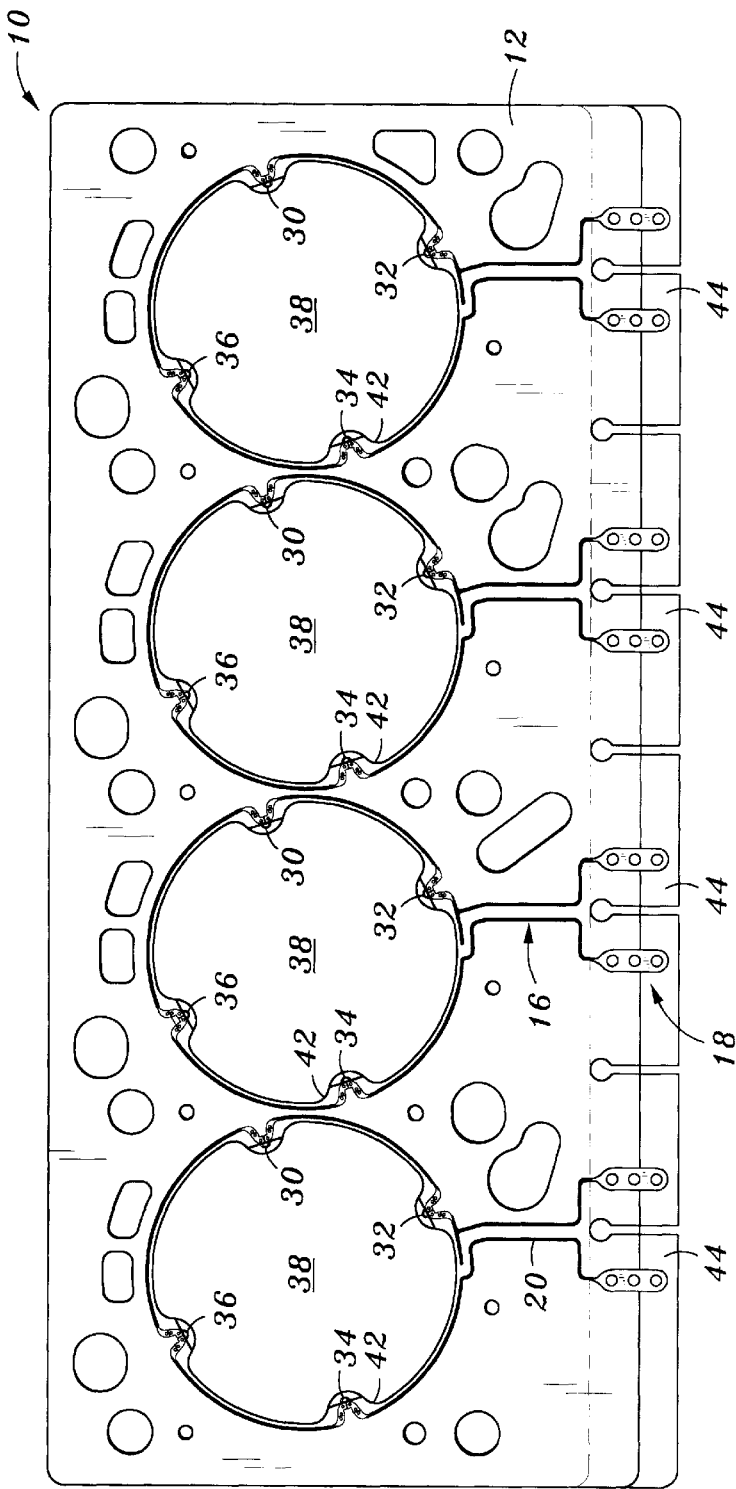
FIG. 1A is a top view of a preferred embodiment of the gasket of the present invention including a surround spark ignition system.

As previously indicated, the gasket 10 of the present invention is formed by two or more layers 12 and 14 of a non-conductive composite fabric reinforced rubber composite laminate material such as described in the above-referenced copending patent applications which have been incorporated into this patent application. Such patent applications should be consulted for a detailed understanding of the formulations, compositions and processing steps proposed for the manufacture of gaskets from the described composite fabric reinforced rubber composite laminate materials as well as the methods for laminating and bonding between layers of such materials strips or sheets of different materials such as the wire circuit 16 of the present. As depicted in FIG. 1A and as will be described in greater detail hereinafter, the circuit 16 is used to connect ignition elements such as spark electrodes, voltage connectors and ground connectors of a surround spark ignition system 18.

Figure 1B:
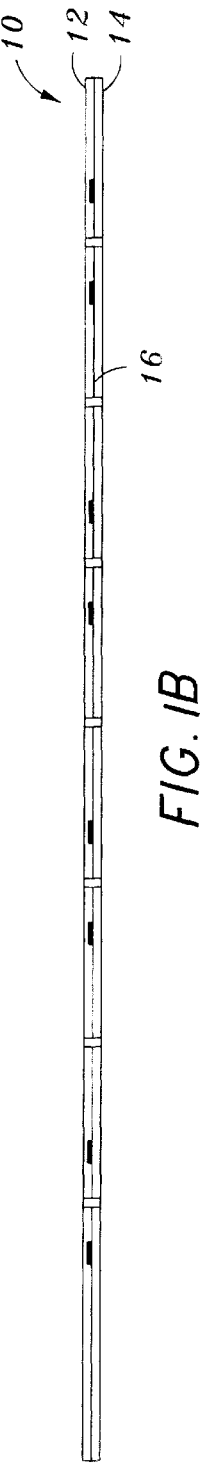
FIG. 1B is an edge view of the gasket of FIG. 1A showing the laminated structure of the gasket in which the wire circuit is embedded.
Figure 3:
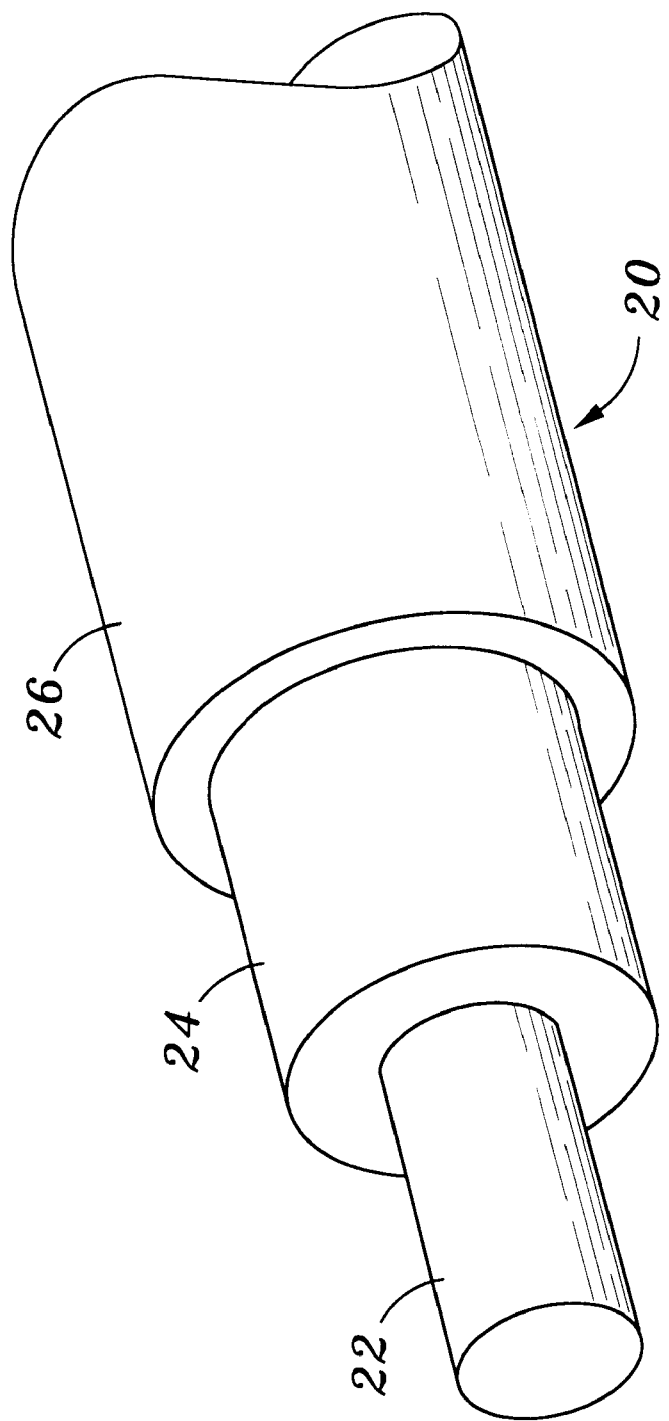
FIG. 3 is a fragmentary, cut away, perspective view of a wrapped wire constructed according to the principles of the present invention.

Central to the present invention, is use within the wire circuit 16 of a small diameter composite layered wire 20, as shown in FIG. 3. As depicted in FIGS. 1A and 1B, the layered wire 20 is embedded within and bonded between the fabric reinforced rubber composite laminate layers 12 and 14 forming the gasket 10. The layered wire 20 comprises a wire 22, such as a thin diameter copper wire, insulated with high dielectric composite layers 24 and 26. The small diameter composite layered wire significantly reduces the cost of producing the surround spark ignition gasket of the present invention and allows the gasket to be made at the lowest thickness for handling high ignition voltage requirements. In this regard, the small diameter of the wire allows the economical use of the more costly different dielectric materials forming the layers 24 and 26. Further, the combination of the different dielectric materials in the layers 24 and 26 of the layered wire 20 of the present invention provides synergistic material property advantages not possible for either dielectric material alone and affords the making of a wire loaded composite gasket with superior compatibility for high adhesive bonding of the wire with the gasket laminate layers avoiding debonding problems common to embedded wire composites.

In particular, as shown in FIG. 3, the layers 24 and 26 making up the layered wire 20 are made up of two basic composite materials which in combination provide a synergistic advantage that neither alone provides. First, the innermost layer 24 is provided by wrapping the wire 20 with a tape of a high dielectric strength material, such as a Teflon® FEP fluoropolymer resin coated polyimide film. An example of such a film is Kapton® type HN film which is synthesized by polymerizing an aromatic dianhydride and an aromatic diamine. When coated on one or both sides with Teflon® FEP fluoropolymer resin such a film is available commercially as Kapton type FN film from Fralock Division of Lockwood Industries of Canoga Park, Calif. The outermost layer 26 of the composite is an extruded high dielectric material such as Teflon® brand tetrafluoroethylene. Such a layer may be formed by extrusion of the Teflon® brand tetrafluoroethylene over the layer 24 to bond the Teflon® brand tetrafluoroethylene layer 26 to the layer 24. Calmont Wire Company of Santa Ana, Calif. has provided to the inventor such extruded Teflon covered layered wire 20. Also, Barcel/CDT Company of Irvine, Calif. uses the above described typical polymide tape coated with Teflon® FEP fluoropolymer resin coated polyimide film for tape wrapping copper wire to achieve high dielectric strength advantages. It is known that Kapton® brand polymide tape as described above has a dielectric a strength of 5 to 6 Kv/mil which is similar to the dielectric strength of Teflon® brand tetrafluoroethylene. However, polymide is hydrophillic and will loose its high dielectric strength in the presence of moisture while retaining good low creep properties. Also, polymide as used in the layer 24 wrapped around the wire 22 will not bond with the fabric reinforced rubber composite laminate material forming the layers 12 and 14 of the gasket 10. Teflon® brand tetrafluoroethylene, on the other hand, as used in the layered wire 20 of the present invention has good moisture resistance and will melt into the fabric reinforced rubber composite laminate of the layers 12 and 14 of the gasket 10 forming a strong adhesive bond between the inner and outer layers of the layered wire 20 and the embedded gasket laminate layers 12 and 14. Such adhesion assures the molding of a uniform composite gasket structures according to the present invention with embedded wire having superior mechanical properties Teflon® and Kapton® are registered trademarks of the E. I. Du Pont De Nemours and Company Corporation.

The layered wire 20 of the present invention is incorporated throughout the wire circuit 16 illustrated in FIGS. 1A and 1B as well as FIGS. 2, 2A, 2B, 2C and 2D. In this regard, in the fabrication of the gasket 10, the wire circuit 16 is embedded between the laminated layers 12 and 14 following the procedures described in the copending patent applications. In this regard, the gasket 10 preferably is fabricated from a fabric-reinforced rubber composite laminate material which transforms to a high dielectric silica ceramic with greater that 90% yield at about 1000° C. Further, when laser cut as described in the copending patent applications, all gasket edges become glass sealed.

Several design features of the circuit 16 are shown most clearly in FIGS. 2 and in enlarged FIGS. 2A, 2B, 2C and 2D.

FIG. 2A shows four electrodes 30, 32, 34 and 36 for each combustion chamber bounded by the cylinder holes 38 in the gasket 10 as being connected in series. In this regard, the electrodes are connected in a circular ring with an overlapping closures 40. This serves to contain the combustion pressure in each associated combustion chamber defined by the cylinder of the internal combustion engine surrounded by the cylinder holes and sealed by the inner marginal edges 42 of the gasket 10 surrounding the cylinders. This is a unique feature of the circuit 16 which is utilized in its surround design to retain combustion pressure.

FIG. 2B shows a high voltage attachment 44 at the edge of the gasket. This allows several advantages during development of the associated gasket 10. In particular, the ground and coil attachment for the spark ignition system may be easily reversed. This allows for easy identification of electrode shorts and allows for determination of the best polarization for optimal spark ignition combustion.

In FIG. 2C, one of the multiple electrodes 30 (four per cylinder) is revealed projecting into the combustion chamber. Note that the electrode is designed with "keeper" which allows the electrode to remain "off" until the keeper is cut. This allows a selection of any combination of four electrodes for spark ignition combustion engine testing.

FIG. 2D illustrates a physically restricted area of the gasket 10, that is the area between cylinders.

While a preferred embodiment has been described in detail herein above, it should be appreciated that changes may be made in the illustrated embodiment without departing from the spirit of the present invention. Therefore, the present invention is to be limited in scope only by the terms of the following claims.

What is claimed is:

1. A gasket of non-conductive material formed of layers of a fabric reinforced rubber composite laminate between which is embedded a wire circuit for connecting spark electrodes, high voltage connectors and ground connectors of a spark ignition system.

2. The gasket of claim 1 wherein the wire circuit includes small diameter wires surrounding gasket openings for bounding and sealing the edges of combustion chambers defined by cylinders in an internal combustion engine.

3. The gasket of claim 2 wherein the small diameter wires are insulated by the high dielectric layers of the gasket as well as by high dielectric wrappings and a sheath of high dielectric material bonded to and within the layers forming to gasket.

4. A gasket for an internal combustion engine, comprising:

a layered wire embedded within and bonded between fabric reinforced rubber composite laminate layers forming the gasket, the layered wire comprising a wire insulated with high dielectric composite layers.

5. The gasket of claim 4 wherein the composite layered wire comprises layers of different high dielectric material.

6. The gasket of claim 5 wherein the layers comprise an innermost layer provided by wrapping the wire with a tape of a high dielectric strength material which is synthesized by polymerizing an aromatic dianhydride and an aromatic diamine.

7. The gasket of claim 6 wherein the layers further comprise an outermost layer of an extruded high dielectric material.

* * * * *